United States Patent [19]

Kenworthy et al.

[11] Patent Number: 4,797,993

[45] Date of Patent: Jan. 17, 1989

[54] METHOD OF MAKING ELECTROWELDABLE SOCKETS

[75] Inventors: David M. A. Kenworthy, Barnsley; Eric Bridgstock, Derbyshire; Edwin A. W. Dunkey, Sheffield, all of England

[73] Assignee: Fusion Plastics Limited, Chesterfield, England

[21] Appl. No.: 74,949

[22] Filed: Jul. 17, 1987

[30] Foreign Application Priority Data

Jul. 26, 1986 [GB] United Kingdom ............... 8618285

[51] Int. Cl.⁴ .................. H01C 17/02; H01C 17/04; H01C 17/28; B23P 19/04
[52] U.S. Cl. .................................... 29/613; 29/460; 29/618; 29/621; 264/272.18; 403/270; 285/21
[58] Field of Search .............. 29/460, 621, 613, 618; 264/272.11, 272.18, 279; 403/265, 267, 270; 285/21; 219/544

[56] References Cited

U.S. PATENT DOCUMENTS

| | | | |
|---|---|---|---|
| 2,683,572 | 7/1954 | Morin | 264/279 |
| 2,942,333 | 6/1960 | Mason | 29/613 |
| 4,282,003 | 8/1981 | Yashin et al. | 29/621 |
| 4,540,533 | 9/1985 | Sahakian | 264/272.18 |

Primary Examiner—P. W. Echols
Attorney, Agent, or Firm—Trexler, Bushnell, Giangiorgi & Blackstone, Ltd.

[57] ABSTRACT

The invention relates to electroweldable sockets. Previously the predominant method of manufacture has been by injection molding which while producing a socket of acceptable quality it is expensive and relatively slow. The objective of the invention is to provide an alternative method of manufacture that is relatively inexpensive and relatively quick and yet does not sacrifice quality, which objective is met by a method comprising winding a length of electrical resistance wire (10) on to a transversely-split bobbin-type mandrel (2), leaving the ends (11) of the wire upstanding from the body part of the mandrel, passing the mandrel through the head (6) of an extrusion plastic processing machine to deposit plastic material (17) around the body part of the mandrel between the flanged ends, and to leave exposed the ends of the wire passing through the wall of the socket exposed, and removing the split mandrel from within the socket after it has emerged from the extrusion head, leaving the winding of resistance wire embedded in the surface of the bore of the socket.

12 Claims, 3 Drawing Sheets

METHOD OF MAKING ELECTROWELDABLE SOCKETS

This invention relates to electroweldable sockets and is particularly concerned with an improved method of manufacture of such sockets.

Electroweldable sockets are sockets formed from an appropriate plastic material, with a winding of electrical resistance wire on or embedded in the surface of the bore of the socket, the winding being attached to terminal pins for connection to a source of electrical power. Thus, with ends of plastic pipes inserted into the socket, the terminal pins are connected to a source of electricity, causing the electrical resistance wire to heat up to a degree and for a period of time sufficient to melt the surface of the bore of the socket and the surfaces of the pipe ends to cause the welding of the socket to the pipe ends.

Hitherto, the predominant method of manufacture of electroweldable sockets has been by injection molding, where a core with a winding of resistance wire is loaded into the die of the injection molding machine, the die being so shaped as to combine with the core to produce the required socket with the simultaneous formation of shrouds surrounding the resistance wire emerging through the wall of the socket, and for the subsequent protection of terminal pins secured to the ends of the resistance wire.

While injection molding, in terms of producing the required shape of finished product of acceptable accuracy, is a good manufacturing technique, it suffers in the sense of being an expensive and relatively slow process. Consequently thought has been given to the less expensive and quicker extrusion process. Thus, it is known to pass a winding of electrical resistance wire through the extrusion head of an extrusion molding machine, to be embedded in the inside wall of a continuous pipe emerging from the extrusion head. To form sockets, the pipe length must subsequently be cut into discrete lengths, and there is the problem that the winding of resistance wire remains wholly within the formed socket, requiring pins to be fired or otherwise forced through the wall of the socket to make contact with the winding of resistance wire.

The object of the present invention is to provide an improved, cost effective method of manufacture of electroweldable sockets.

According to the present invention, a method of manufacture of an electroweldable socket, comprises winding a length of electrical resistance wire on to a transversely-split bobbin-type mandrel, leaving the ends of the wire upstanding from the body part of the mandrel, passing the mandrel through the head of an extrusion plastic processing machine to deposit plastic material around the body part of the mandrel between the flanged ends, and to leave exposed the ends of the wire passing through the wall of the socket exposed, and removing the split mandrel from within the socket after it has emerged from the extrusion head, leaving the winding of resistance wire embedded in the surface of the bore of the socket. Terminal pins can be connected to the ends of the wire wound on the mandrel subsequent to the deposit of plastic material, the ends of the wire winding being left exposed after the deposit of plastic material on the mandrel.

However, terminal pins can be secured in any suitable manner to the ends of resistance wire before the deposit of plastic material on the mandrel, such as by an appropriate crimping technique, and it is preferred that the terminal pins lie within shrouds provided on the socket. The shrouds can subsequently be secured to the socket, but it is preferred that terminal shrouds are formed on the socket during extrusion. To enable this, prior to insertion of the split mandrel into the extrusion head, a cap can be located on it, the cap having appropriate holes in which the upstanding ends of the resistance wire with or without terminals are located, and annular recesses surrounding the holes. As the mandrel and cap progress through the extrusion head, the annular recesses are filled as the socket is formed, and after the assembly emerges from the extrusion head, the cap is removed, the split mandrel removed, leaving either the terminal pins or the exposed ends of the resistance wire lying within the integral shrouds. Additional features can be located on the cap for embedding in the plastic material forming the socket, such as for example fusion indicators which are desirable during the subsequent use of the socket.

Thus, with the through passage in the extrusion head of a shape such that the split mandrel flanges or flanges and cap are a close sliding fit in the passage, progression of the mandrel or mandrel and cap results in the substantially continuous production of separate sockets, and with the ends of the resistance wire passing through the walls of the sockets. If required, and as a further means of guiding the mandrels, they may be provided with a through hole whereby the mandrels can be loaded on a guide bar extending through the passage. The invention therefore most effectively combines the advantages of both injection and extrusion molding.

By providing an appropriate pusher assembly, the mandrels can be progressed along the guide bar through the passage and when provided and through the extrusion head, at a rate to suit the rate of extrusion of plastic material into the extrusion head. However, it would be possible to halt temporarily the progression of each mandrel through the extrusion head to ensure the correct formation of each socket, and when an appropriate accumulator can be provided to create the pressure necessary in the plastic material for the production of the finished product. The presence of an accumulator can also compensate for the inlet opening into the extrusion head being closed as the abutting flanges of adjacent mandrels pass across it, to provide a further alternative construction avoiding the need to halt temporarily the extruder to coincide with the closing of the inlet opening. The provision of an accumulator can be beneficial when the invention involves the simultaneous production of shrouds on the sockets. Plastic material emerging into the extrusion head and around the mandrel suffers an immediate loss of pressure, compensated for by the pressure in the plastic material in the accumulator, which additional pressure serves to ensure that the annular recesses in the cap are filled correctly.

Two embodiments of the invention will now be described by way of example only with reference to the accompanying drawings in which.

Figure 1:
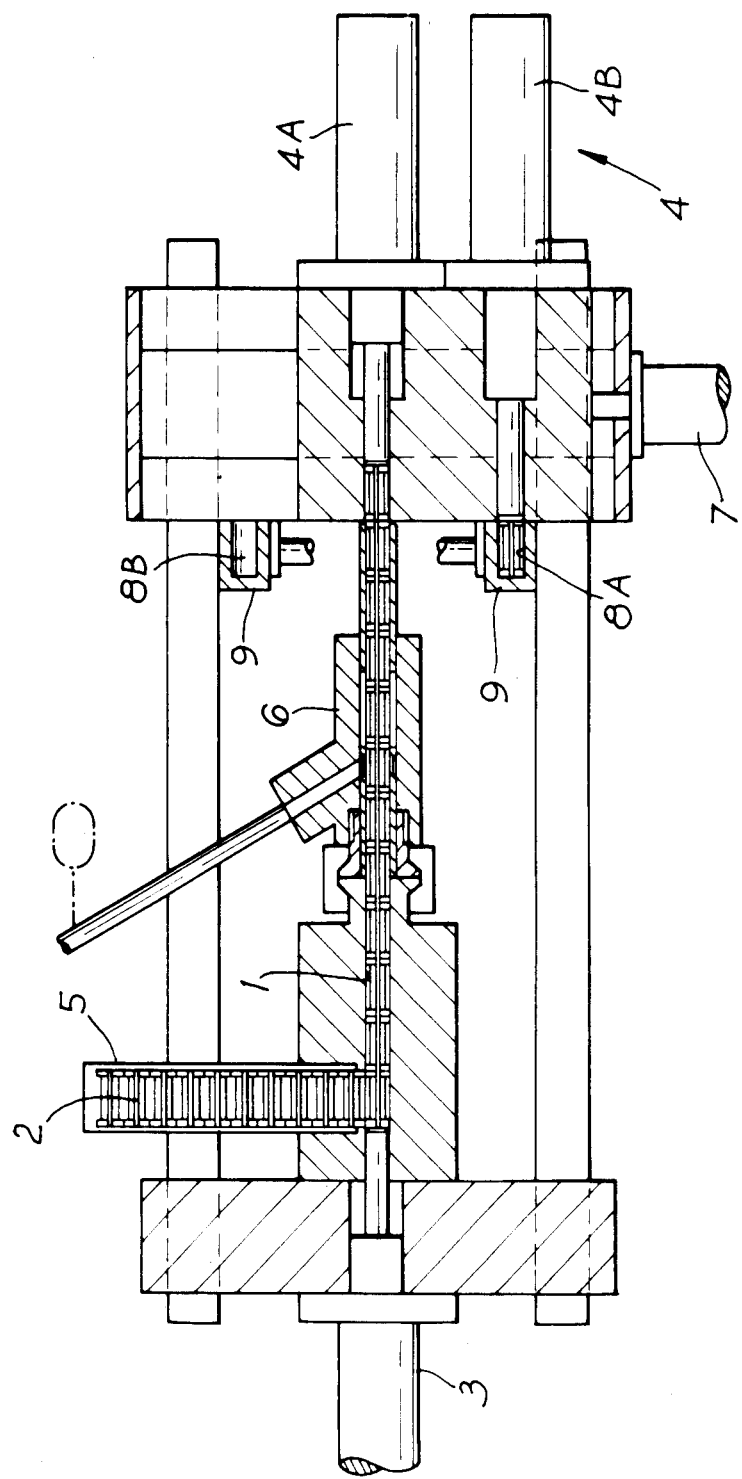
FIG. 1 is a part schematic sectional plan view of equipment for performing the method of the invention.

FIG. 1 depicts an extrusion machine having a central cylindrical passage 1 along which are progressed a number of mandrels 2 there being a feed ram 3 to the inlet side of the machine and a take off ram 4 to the outlet side of the machine.

To the inlet side of the machine is an angled gravity feed channel 5 for the mandrels 2. Thus, the feed ram 3 is activated to urge a mandrel located co-axially with the central passage 1 into the passage, and on retraction of the ram the next succeeding mandrel falls into place and when next activation of the ram urges the second mandrel into the passage and the first mandrel along the passage, this procedure being continued continuously and such that a succession of mandrels are progressed through the extrusion machine.

Part way along the central passage 1, an extrusion head 6 for plastic material is provided. The arrangement being such that as the progression of the mandrels along the passage 1 is temporarily halted as the feed ram is retracted to allow a next successive mandrel to be positioned co-axial with the passage, a mandrel is positioned in the extrusion head and whereby plastic material can be extruded into the head to encircle the mandrel positioned in the head. Mandrels now provided with a formed socket of plastics material are progressed out of the extrusion head and to the take-off side of the machine. As shown in the drawings, the take-off ram is effectively formed by two piston and cylinder units 4A, 4B mounted on a shuttle operated by a shuttle ram 7. At the onset of operations, mandrels are progressed through the guide channel and the extrusion head until a first mandrel meets a ram of one of the piston and cylinder units 4A, 4B. Further forward movement of the mandrel drives the ram rearwardly against its, e.g., hydraulic pressure and whereby further control is imposed over the progression of the succeeding mandrels through the extrusion head. With the first mandrel located in the shuttle, and at the point where the progression of the succession of mandrels is temporarily halted, the shuttle ram 7 is activated to bring the second piston and cylinder unit co-axial with the feed channel for the mandrels, and carry the first mandrel located in the shuttle to a position where it can be ejected by the ram of the piston and cylinder unit into a receiving passage 8 in a water column 9. As the first mandrel is being deposited in it receiving passage 8, the next mandrel is being urged in controlled manner against the action of the second piston and cylinder unit to be located in the shuttle, and when reverse activation of the shuttle ram 7 brings the second mandrel to a position where it can be ejected into a second receiving passage 8A in the water column, by when the first mandrel and its encircling plastic socket will have cooled sufficiently to allow the removal of the first mandrel from its receiving passage 8.

Figure 2:
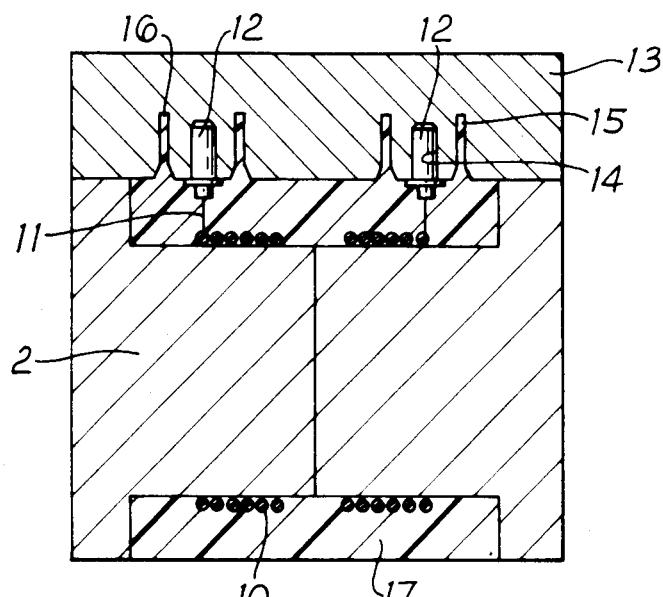
FIG. 2 is a sectional side elveation of a split mandrel and its cap.
Figure 3:
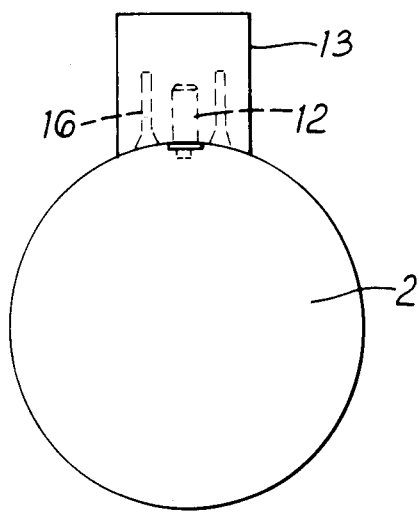
FIG. 3 is an end view of FIG. 2.

As shown by FIGS. 2 and 3, each mandrel 2 is of bobbin shape, and is transversley split approximately centrally. The diameter of the flanges of the mandrel are such that they are a close sliding fit in the central passage 1 through the machine whereby to ensure that in the extrusion head 6 seepage of plastic material passed the flanges is substantially minimized or even eliminated, to ensure the production of discrete sockets on the mandrel between the flanges.

Prior to the location of the mandrels in the angled gravity feed passage to the machine, they are each provided with a winding of wire 10, the free ends 11 of which are left upstanding. Thus, as is also shown in FIGS. 2 and 3, the free ends of the wire winding are provided, prior to molding, with terminal pins 12 and a cap 13 is fitted to the mandrel with spaced holes 14 to receive each terminal pin, with an annular slot 15 surrounding each hole in which a protective shroud 16 is formed as the socket 17 is injection molded onto the mandrel in the injection head of the machine. Thus, as each mandrel is provided with a plastic socket in the extrusion head, the winding of wire on the bobbin is embedded in the inner wall of the socket leaving the free ends of the wire protruding through the outer surface of the socket with the terminal pins lying within the shrouds, and after removal of the mandrels and sockets from the machine, the cap can readily be removed and the mandrels being split can readily be removed from within the socket without disturbing the winding of wire embedded on the inner surface of the mandrel.

Figure 4:
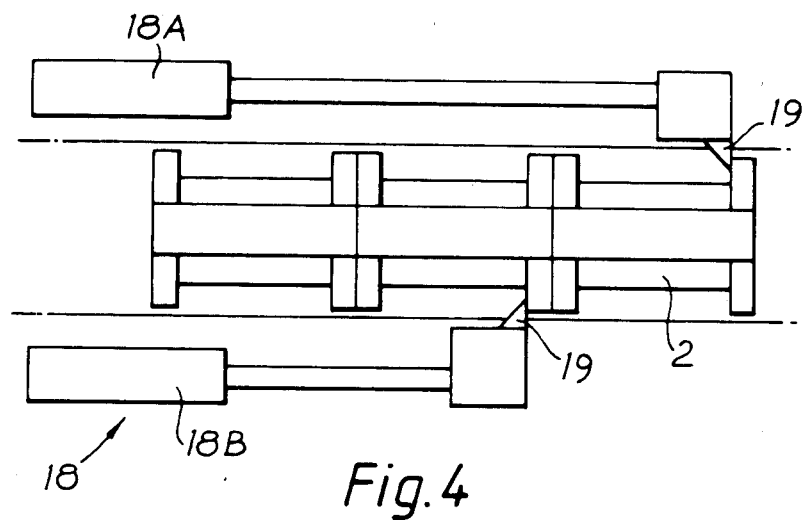
FIG. 4 is a schematic plan view of an alternative pusher assembly to that depicted in FIG. 1.
Figure 5:
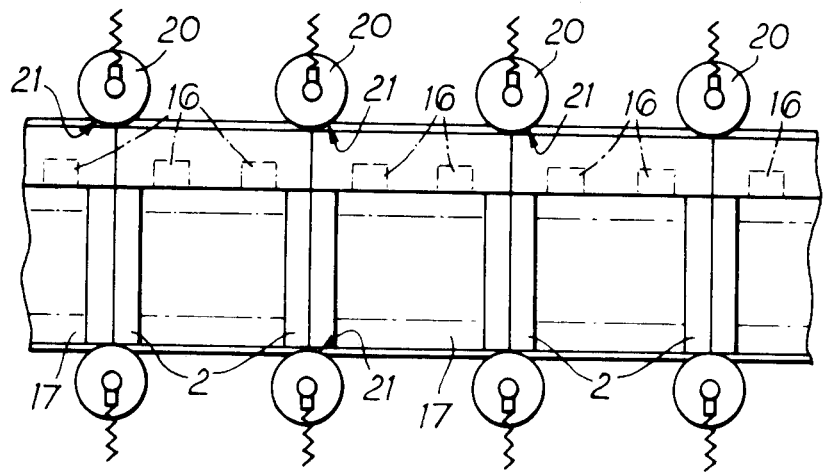
FIG. 5 is a schematic plan view of an alternative take-off assembly to that depicted in FIG. 1.

To enable a continuous progression of mandrels 2 through the equipment, the single pusher ram assembly of FIG. 1 can be replaced by a double pusher ram assembly 18 shown in FIG. 4. Thus, a first pusher ram 18A has a latch 19 to engage a mandrel, and urge it from the feed channel and into the passageway, during which the second pusher ram 18B is retracted ready to engage the next mandrel. As the first pusher ram completes its movement the second pusher ram commences its drive stroke and the first ram retracted ready to engage the next successive mandrel.

At the outlet side of the injection head 6, a number of spring-loaded resilient rolls 20, are provided extending through slots 21 in the wall of the passageway to bear on the top of the cap 13 and the bottom of the flanges of the mandrel to provide a restraint on the progression of the mandrels, as they progress to an exit from the passage from where they are removed by hand or by other suitable means for placement in a cooling zone where solidification of the socket 17, and shrouds 16 is accelerated.

What we claim is:

1. A method of manufacture of an electroweldable socket comprising, winding a length of electrical resistance wire on to a transversely-split bobbin-type mandrel with a body part between flanged ends, leaving the ends of the wire upstanding from the body part of the mandrel, passing the mandrel through the head of an extrusion plastic processing machine to deposit plastic material around the body part of the mandrel between the flanged ends, and to leave exposed the ends of the wire passing through the wall of the socket, and removing the split mandrel from within the socket after it has emerged from the extrusion head, leaving the winding of resistance wire embedded in the surface of the bore of the socket.

2. A method as in claim 1, wherein terminal pins are connected to the ends of the wire wound on the mandrel subsequent to the deposit of plastic material, the ends of the wire winding being left exposed after the deposit of plastic material on the mandrel.

3. A method as in claim 1, wherein terminal pins are secured in any suitable manner to the ends of resistance wire before the deposit of plastic material on the mandrel.

4. A method as in claim 2 or claim 3, wherein the terminal pins lie within shrouds provided on the socket.

5. A method as in claim 4, wherein the shrouds are subsequently secured to the socket.

6. A method as in claim 4, wherein terminal shrouds are formed on the socket during extrusion.

7. A method as in claim 6, wherein prior to insertion of the split mandrel into the extrusion head, a cap is located on it, the cap having appropriate holes in which the upstanding ends of the resistance wire with or without terminals are located, and annular recesses surrounding the holes.

8. A method as in claim 7, wherein additional features are located on the cap for embedding in the plastic material forming the socket.

9. A method as in claim 1, wherein a single pusher assembly is provided to progress the mandrels through the machine.

10. A method as in claim 1, wherein a double pusher assembly is provided to progress the mandrels through the machine.

11. A method as in claim 1, wherein an accumulator is provided in the supply line for plastic material to the extrusion head to assist in the supply of plastic material.

12. A method as in claim 1, wherein at the outlet side of the extrusion head means are provided to restrain movement of the mandrels and assist in the smooth progression of the mandrels to the outlet from the machine from where they are removed and placed in a cooling zone.

* * * * *